(12) United States Patent
Merka

(10) Patent No.: US 10,370,258 B2
(45) Date of Patent: Aug. 6, 2019

(54) METHOD FOR COMPLEX TREATMENT OF PHOSPHOGYPSUM

(71) Applicant: FERIN SP. Z O.O., Kedzierzyn-Kozle (PL)

(72) Inventor: Wlodzimierz Merka, Kedzierzyn-Kozle (PL)

(73) Assignee: FERIN SP. Z O.O, Kedzierzyn-Kozle (PL)

(*) Notice: Subject to any disclaimer, the term of this patent is extended or adjusted under 35 U.S.C. 154(b) by 0 days.

(21) Appl. No.: 15/574,902

(22) PCT Filed: Apr. 25, 2016

(86) PCT No.: PCT/PL2016/000045
§ 371 (c)(1),
(2) Date: Nov. 17, 2017

(87) PCT Pub. No.: WO2016/186527
PCT Pub. Date: Nov. 24, 2016

(65) Prior Publication Data
US 2018/0162740 A1  Jun. 14, 2018

(30) Foreign Application Priority Data
May 20, 2015 (PL) .......................... 412427

(51) Int. Cl.
*C01F 11/46* (2006.01)
*C01B 32/50* (2017.01)
(Continued)

(52) U.S. Cl.
CPC ............ *C01F 11/468* (2013.01); *C01B 7/191* (2013.01); *C01B 25/324* (2013.01); *C01B 32/50* (2017.08);
(Continued)

(58) Field of Classification Search
None
See application file for complete search history.

(56) References Cited

U.S. PATENT DOCUMENTS 1,758,449 A * 5/1930 Liljenroth ................ C01O 1/24
423/548
1,826,785 A * 10/1931 Holz ...................... C05B 11/08
423/157.4
(Continued)

FOREIGN PATENT DOCUMENTS

CA  2852131  5/2013
CN  1978420  6/2007
(Continued)

OTHER PUBLICATIONS

Translation of WO 2013/060689 (Year: 2013).*
PCT Search Report and Written Opinion for PCT/PL2016/000045, dated Aug. 16, 2016.

*Primary Examiner* — Sheng H Davis
(74) *Attorney, Agent, or Firm* — Barnes & Thornburg LLP

(57) ABSTRACT

A method for complex treatment of phosphogypsum comprising crushing of phosphogypsum and its washing with a solution of sulphuric acid, concentration 2-15%, and stirring at 50-80□ C., wherein the resultant mixture is separated into a liquid fraction and a sediment containing mostly calcium sulphate, which is characterized in that metals are precipitated from the liquid fraction, mainly lanthanides, phosphates and sulphates of metals soluble in diluted sulphuric acid, and the sediment containing mostly calcium sulphate is converted in the presence of ammonia liquor and carbon dioxide to ammonium sulphate and calcium carbonate, wherein filtered and dried sediment of calcium carbonate is dissolved in a 15-30% solution of nitric acid while stirring continuously, and then the resultant $CO_2$ is recirculated and (Continued)

used in the conversion of the first phase of the sediment, and the resultant mixture is separated into a solution of calcium nitrate with dissolved metals and a sediment of fluorides and silicates with metal precipitate.

19 Claims, 2 Drawing Sheets

(51) Int. Cl.
    *C05C 5/04*    (2006.01)
    *C01F 11/18*    (2006.01)
    *C05D 3/02*    (2006.01)
    *C05D 9/00*    (2006.01)
    *C01B 25/32*    (2006.01)
    *C01B 7/19*    (2006.01)
    *C01C 1/24*    (2006.01)
    *C01F 11/38*    (2006.01)

(52) U.S. Cl.
    CPC ............... *C01C 1/24* (2013.01); *C01F 11/18* (2013.01); *C01F 11/38* (2013.01); *C01F 11/46* (2013.01); *C05C 5/04* (2013.01); *C05D 3/02* (2013.01); *C05D 9/00* (2013.01)

(56) References Cited

U.S. PATENT DOCUMENTS

| | | | |
|---|---|---|---|
| 2,640,757 A | 6/1953 | Robinson | |
| 5,425,800 A | * 6/1995 | Buter | ............. C22B 11/04 |
| | | | 423/22 |
| 2013/0288887 A1 | 10/2013 | Wu et al. | |
| 2014/0044619 A1 | 2/2014 | Hasinoff et al. | |

FOREIGN PATENT DOCUMENTS

| | | | |
|---|---|---|---|
| CN | 101186318 | * | 12/2007 |
| DE | 10230592 | | 1/2004 |
| GB | 310276 | | 4/1929 |
| GB | 512005 | * | 8/1939 |
| PL | 157981 | | 7/1992 |
| PL | 166137 | | 4/1995 |
| RU | 2526907 | * | 3/2013 |
| RU | 2012134522 | | 2/2014 |
| WO | 2013060689 | * | 3/2013 |
| WO | WO2013/060689 | | 5/2013 |

* cited by examiner

METHOD FOR COMPLEX TREATMENT OF PHOSPHOGYPSUM

CROSS-REFERENCE TO RELATED APPLICATIONS

This application is the U.S. national phase of PCT/PL2016/000045, filed on Apr. 25, 2016, and claims the benefit to Polish Patent Application Number P.412427, filed on May. 20, 2015, the entire disclosures of which are incorporated herein by reference.

The present invention refers to a method for complex treatment of phosphogypsum waste generated from the processing of phosphorites and apatites of various origin.

Tremendous waste generated from the processing of phosphorites and apatites of various origin is a serious environmental problem all over the world.

In the art, there are a lot of methods for processing or direct use of waste phosphogypsum For example, there is known a method where phosphogypsum is washed with a water solution of citric acid in concentration of 4-5% to obtain gypsum for construction.

Another method to directly use phosphogypsum is to add it to cement in a quantity of 3% to 4%.

Another method is to use phosphogypsum mixed previously with urea as a fertilizer for agriculture.

Patent document PL 178169 disclosed precipitation of rare earth metals from phosphogypsum by treating it multiple times with 25% solution of nitric acid at 95° C. This method turned out unviable due to a small amount of these metals in phosphogypsum.

Patent document PL 166137 describes a method for obtaining from phosphogypsum a multi-ingredient mineral fertilizer by using urea phosphate and potassium salt.

Patent document PL 157981 describes a method for complex treatment of phosphogypsum in a biochemical way—however, it has the drawbacks as it requires great quantities of nutrients (sugars, e.g. plant sugars, molasses) and water in a quantity 25-fold higher than the weight of phosphogypsum—which makes the process totally unviable.

The most profitable way known in the art is currently to process phosphogypsum into ammonium sulphate and chalk as it is described in at least three patent documents, i.e. U.S. Pat. No. 2,640,757, PL 11028 and PL 108676. The majority of patent documents focus on recovering mainly apatite rare earth metals and this is where phosphogypsum processing ends; unfortunately, as a result of all the known methods still around 98% of phosphogypsum mass remains as waste, and this waste is stored in the dumps and contaminates environment.

As it can be concluded from the foregoing, the known methods of treating phosphogypsum waste dumps are unviable or make up only a partial solution leading to a continual increase in the capacity of waste dumps. This kind of waste contains noble metals but their recovery by known methods is so little and costly that it is unprofitable.

The purpose of this invention is to develop such a method for treatment of phosphogypsum that almost all fractions originating in the treatment can become useful products suitable for further use.

A method for complex treatment of phosphogypsum comprises breaking up of phosphogypsum, then washing it with a solution of sulphuric acid at a concentration of 2-15% and mixing at 50 to 80° C.; the resultant mixture is then separated into a liquid fraction and a sediment usually containing calcium sulphate. Liquid fraction precipitate includes metals, mainly lanthanides, phosphates and sulphates of metals soluble in diluted sulphuric acid. The process takes place by cooling the solution in order for phosphates to precipitate, and then the mixture is separated and phosphates (mainly calcium phosphates) are obtained in the form of a product ready for use as an addition in the production of fertilizers, whereas trimercaptotriazine trisodium salt is added to the solution with metals so that metals can precipitate, and resultant mixture is separated again to obtain metal complex sediment as a semi-finished product and a liquid fraction which is recirculated into the washing process. The sediment which is mainly composed of calcium sulphate is converted to ammonium sulphate and calcium carbonate in the presence of ammonia liquor and carbon dioxide. Ammonium sulphate is crystallized to obtain a product ready for further use, and the sediment of calcium carbonate is dissolved in a solution of nitric acid at a concentration of 15-30% by continuous stirring. $CO_2$ produced in the reaction is recirculated and used in the conversion of the first phase of the sediment, and the resultant mixture is separated into a solution of calcium nitrate with metals dissolved therein, and a sediment of fluorides and silicates with metal precipitations. The sediment of fluorides and silicates with metal precipitations is hot-solubilized in concentrated sulphuric acid at 100° C. As a result, the following are produced: hydrogen fluoride, sediment of silicates with metals and calcium sulphate, as well as a solution of metals dissolved in concentrated sulphuric acid. Water is saturated with hydrogen fluoride and as a result a finished product is obtained: hydrofluoric acid. The solution of metals in sulphuric acid is neutralized by ammonia liquor to pH of 7-9 as a result of which ammonium sulphate is formed, to which acetylacetone and dimethylglyoxime are added, after which the fractions are separated producing a solution of ammonium sulphate and a sediment in the form of metal complex concentrate. The solution of ammonium sulphate is concentrated and crystallized to produce a finished product, and the sediment of metal complex concentrate is dried and roasted to produce a concentrate of metal compounds, mainly the compounds of hafnium, zirconium, niobium and palladium, which is a semi-finished product for further processing. The solution of calcium nitrate with metals dissolved therein is neutralized with ammonia liquor to pH of 7 to 9, and then metals are precipitated in two stages, first with acetylacetone and then with trimercaptotriazine trisodium salt. The resultant mixture is separated to produce a sediment of metal complexes, mainly complexes of lanthanides, and a solution of calcium nitrate. The sediment of metal complexes is a semi-finished product for further separation, and the solution of calcium nitrate is a finished product.

The sediment of silicates with metals and calcium sulphate is converted in the presence of ammonia liquor and carbon dioxide to ammonium sulphate and calcium carbonate to obtain ammonium sulphate and calcium carbonate with silicates containing metals. $CO_2$ produced in the process is recirculated to conversion process. Ammonium sulphate in liquid or crystalline form constitutes a finished product. Calcium carbonate with silicates containing metals is dissolved in nitric acid at a concentration of 15 to 30%, and the remaining mixture is separated to obtain a solution of calcium nitrate and a sediment in the form of silicates with metals. The solution of calcium nitrate is neutralized with ammonia liquor or ammonium to pH 7-9 and trimercaptotriazine trisodium salt is added to precipitate metals, and what is obtained is a fertilizer of mainly calcium nitrate in the form of a solution which is finished product, and a concentrate of metal complexes, which is a semi-finished product for further processing. The solution of sodium hydroxide is added to the sediment of silicates and metals and the resultant mixture is heated up to 100 to 300° C. as a result of which silicates dissolve, and then water is added to this mixture to reduce viscosity of the solution, and then metals are precipitated with the use of strong reducers. The mixture obtained this way is separated to obtain a sediment of noble metals as a semi-finished product for further processing and liquid glass, which after concentrating is a finished product.

Phosphogypsum is formed in the process of producing phosphoric fertilizers from phosphates and apatites; these fertilizers belong to the most important ones for agriculture. In the production process huge amounts of waste are produced: 3 t of phosphogypsum per 1 t of phosphates, and additionally as much as 80% of actinides are carried to fertilizers. Phosphogypsum dumps pose an environmental risk as heavy metals, remaining phosphates and actinides are washed out and reach the waters. Dumps occupy large and usually fenced areas, additionally they give off gaseous radon and dust. A method for complex treatment of phosphogypsum according to the invention makes it possible to liquidate almost 100% of huge waste dumps which is tremendously significant from environmental perspective when it comes to waste management. This method, in addition to being highly effective, is also economically viable, as a cheap method makes it possible to generate a lot of products for further sale, including noble metals such as palladium, rhodium, ruthenium, platinum and gold. Reuse of sulphuric acid and carbon dioxide generated in the process contributes to significant reduction of process cost. The invention addresses the problem holistically and makes it possible to economically produce valuable fertilizers: ammonium sulphate and calcium nitrate, additionally enriched with phosphates. The invention makes it possible to obtain concentrates of lanthanide metals, indispensable for modern economy branches, as well as metals important for nuclear industry such as uranium, thorium, hafnium, yttrium and niobium. While processing phospho gypsum according to the invention no new waste or gases are emitted to environment.

Hereunder, there are the examples of invention embodiments:

EXAMPLE 1

Figure 1:
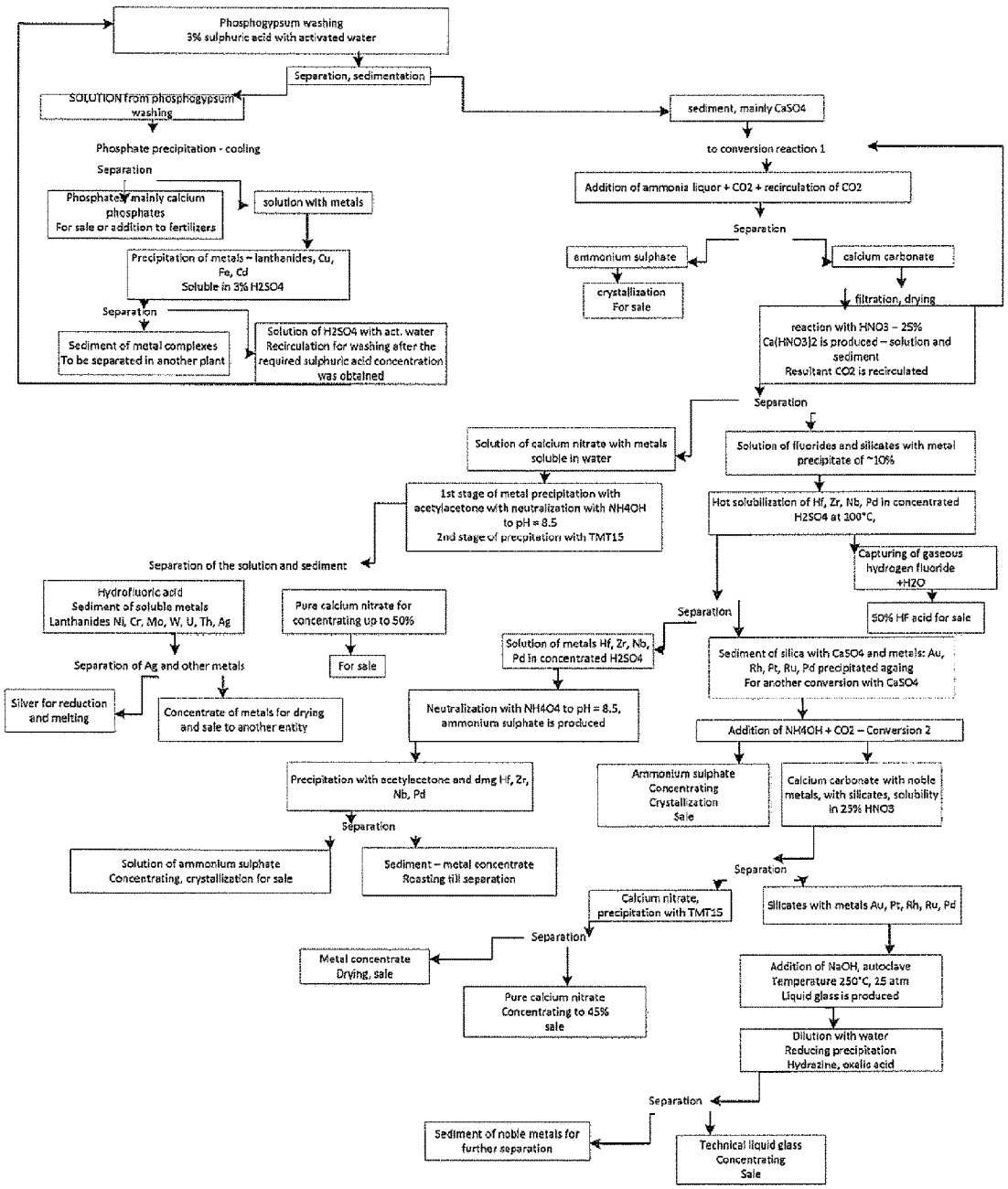
FIG. 1 is a block diagram that shows an embodiment of the method of complex treatment of phosphogypsum. The tables show the results of tests for the content of the elements in phosphogypsum.
Figure 2:
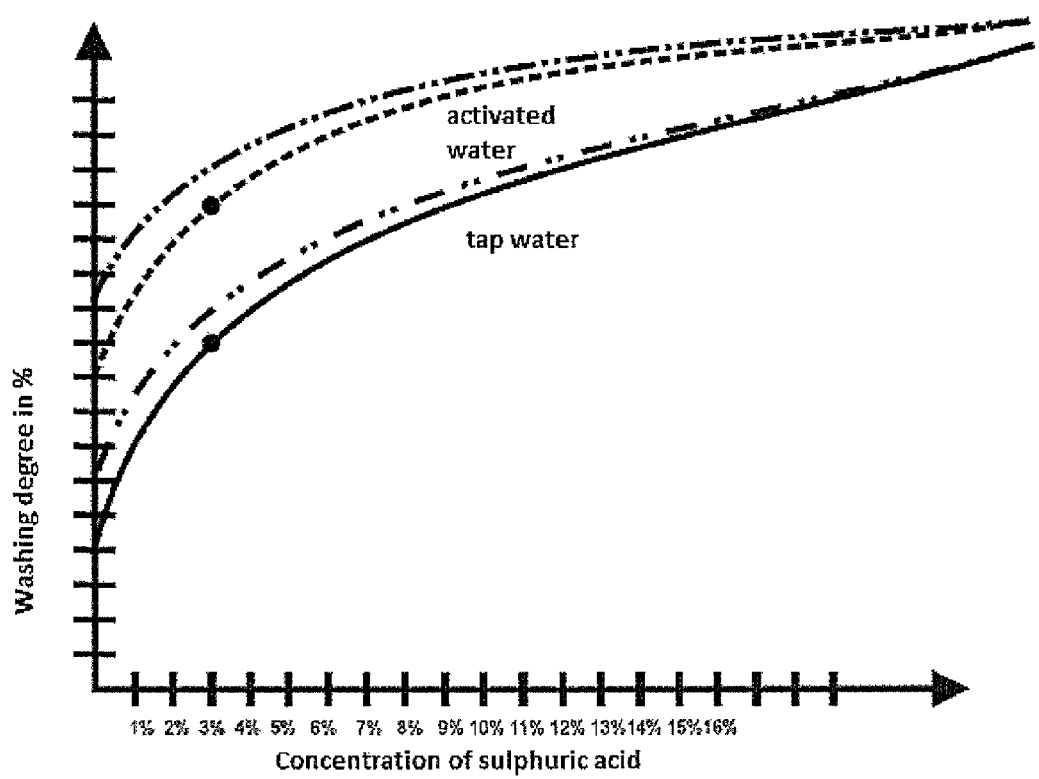
FIG. 2 shows the washing ability of activated water and tap water to dissolve sulphuric acid.

An excavator took from the phosphogypsum dump originating from the processing of phosphates from Florida, USA, a mass of material similar to sand, which was spread and sieved out on a screen, mesh 12 per 1 cm, for further processing, advantageously to have a bulk mass grain lower than 0.7 mm. 1 t of phosphogypsum mass out of this was then dosed to a tank with a low-speed stirrer, and then water at 35° C. was added, previously passed through the cold plasma field on "NANTES" device of a capacity of 40 m3/day, wherein pH of this declustered water was 5.5. The cold-plasma activated water has an advantage over normal tap water that its capacity for dissolving phosphates and soluble salts is higher by 40% as shown in the chart, FIG. 2. 2 t of water was added, and was stirred continuously until pulp was formed, and sulphuric acid was added to have its concentration of 3%. The highest washing level was obtained for 10% concentration of sulphuric acid, however, the difference between washing and solving for these concentrations is as little as 10%, therefore from economical perspective it is enough to have a concentration of 3%. The mixture was subjected to continuous stirring, and advantageously subjected to ultrasound in the period of around 10 minutes, and then, while stirring continuously, it was heated up for 4 hours up to 60° C. Then the stirring was stopped. Gypsum was deposited via sedimentation, and the remaining solution was separated by pumping it to another tank (tanks are made of acid-resistant steel or concrete coated with a layer of epoxy resin—here Epidian 607 with amine hardener IDA, coating layer of 5 mm—manufactured by Sarzyna).

The solution of sulphuric acid in activated water with washed out phosphates and heavy metals and sulphates of lanthanides and metal actinides was cooled to a temperature of 10° C., at which phosphates in the amount of approx. 1.5% (out of total approx. 2% in phosphogypsum) are precipitated. The mixture was separated in a hydrocyclone manufactured by FLSmidth KREBS—5505 W Gillette Road, Tucson, Ariz. 85743-9501, USA. Afterwards, the phosphate sediment was concentrated to 50% and in this form it can be sold as an additive to agricultural fertilizers or it can be added to the fertilizers produced in the further process. The solution of sulphuric acid and activated water was cleaned by precipitation of metal complexes by adding 10 kg of acetylacetone to the solution, which corresponds approximately to the weight of the dissolved heavy metals. Then, ammonia liquor was added to obtain pH of 8.5 of the solution, and 2 kg of trimercaptotriazine trisodium salt (15% solution—1 kg·1 m3 of the solution) produced by EVONIK Degussa GmbH, Rodenbacher Chausse 4, 63457 Hanau, Germany was added to 2 to of this solution. As a result of this process, complexes of heavy metals, lanthanide metals and actinide metals were precipitated. The mixture was separated in the aforementioned hydrocyclone. All the metal complexes precipitated in the two-stage precipitation step are suitable for further processing into oxides by roasting at 400° C. They constitute a precious polymetallic mixture of oxides for further treatment. The remaining solution of $H_2SO_4$ in activated water, after replenishing sulphuric acid concentration, was recirculated to the phosphogypsum washing process.

Calcium sulphate sediment obtained by sedimentation continues to be a basic mass for further processing, with as little as 2% of its weight lost in the process. 980 kg of gypsum was converted to ammonium sulphate (agricultural fertilizer) and calcium carbonate in the process known in the art and performed on a technical scale—the Merseburg process. The process is illustrated by the following reaction:

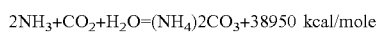

$$2NH_3 + CO_2 + H_2O = (NH_4)2CO_3 + 38950 \text{ kcal/mole}$$

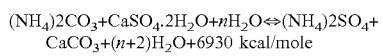

$$(NH_4)2CO_3 + CaSO_4 \cdot 2H_2O + nH_2O \Leftrightarrow (NH_4)2SO_4 + CaCO_3 + (n+2)H_2O + 6930 \text{ kcal/mole}$$

The conversion process was performed with the solution's pH of 9.1 at 44° C. As the reaction is of exothermic nature, while cooling down the mixture the temperature was kept under 50° C. Reaction time was 4 h.

The reactive agents were introduced in the following order: 2 t of ammonia liquor, conc. 24%, was added to the phosphogypsum mass, then carbon dioxide was pumped through the ceramic diffuser at a rate of 4000 l/h. All the accumulated surplus of CO2 was recirculated to the conversion process and redirected to the ceramic diffuser.

For the loaded portion of 980 kg of phosphogypsum with approximate composition 63% of $CaSO_4 \cdot 2H_2O$, 0.76% of $P_2O_5$ and 32% of water+contaminations the transformation level is close to 97% with average ammonium output of 0.97.

The reaction products, after separation on the filter, were washed, dried and crystallized to obtain:
1st part—precipitate—chalk
$CaCO_3 = 73.1\%$ by weight, $CaSO_4 2H_2O=2.3\%$
$(NH_4)_2SO_4=6.8\%$
$H_2O=5.7\%$
Mineral contamination=5.1% by weight
2nd part—ammonium sulphate solution
$(NH_4)_2SO_4=33.8\%$ by weight
$(NH_4)HP_4=0.3\%$
$CO_2=0.4\%$
$H_2O=65.2\%$ Ammonium sulphate was condensed in a vacuum evaporator and solidified in a crystallizer obtaining a ready product in the form of an agricultural fertilizer.

Chalk sediment was treated with 27% nitric acid in a separate tank at 25° C. over 40 minutes with the following reaction:

$$CaCO_3+2HNO_3=Ca(NO_3)_2+CO_2+H_2O,$$

and carbon dioxide emitted in the process was recirculated to the calcium sulphate conversion process (as in the process diagram).

Mainly calcium nitrate was obtained in the form of a solution with around 700 kg of calcium nitrate and a sediment. These compounds were then separated in a hydrocyclone and a filter press. The sediment contains insoluble silicates, fluorides and metals—mainly noble metals Pd, Pt, Rh, Ru, Au.

The insoluble sediment in total constitutes around 10% of the mass, i.e. around 100 kg. After separation from the sediment, calcium nitrate was neutralized by ammonia to pH of 8 and then the dissolved metals were precipitated in two stages by addition of 4 kg of acetylacetone and addition of 2 kg of trimercaptotriazine trisodium salt. This reaction produces a precipitate of metals dissolved in nitric acid, including rare earth metals and partly silver remaining as a by-product for further processing in another plant.

Whereas the insoluble sediment, precipitated beforehand by centrifugation of 100 kg and containing mainly calcium fluoride and silicates was treated with 120 kg of concentrated sulphuric acid at 100° C. in a separate acid-resistant tanks, as a result of which the following reaction took place:

$$CaF_2+H_2SO_4=CaSO_4+2HF.$$

The resultant hydrogen fluoride was passed through the water until it reached a concentration of 50% producing around 60 kg of hydrofluoric acid as a finished product.

In the reaction with concentrated sulphuric acid metals are dissolved, mainly: hafnium, zirconium, niobium and palladium as a solution, and a sediment of silicates with the other metals, mainly gold, platinum, rhodium, ruthenium and again calcium sulphate (gypsum). The sediment and the solution were separated to obtain 70 kg of sediment and a solution of concentrated sulphuric acid.

The solution of concentrated sulphuric acid with dissolved metals was neutralized with ammonia liquor to pH of 8.5, then 0.13 kg of acetylacetone was added, and 35 g of dimethylglyoxime in the 1:1 solution of ethyl alcohol was added. As a result metal complexes were precipitated. The sediment of complexes of metals, mainly: Hf, Zr, Nb, Pd as well as ammonium sulphate solution were separated. The sediment of metal complexes was dried and then roasted at 850° C. to obtain a mixture of oxides being a semi-finished product. Ammonium sulphate solution was concentrated by evaporating water and crystallizing to obtain a finished product—agricultural fertilizer.

70 kg of sediment underwent another conversion reaction (conversion II) of calcium sulphate to ammonium sulphate in a reaction with ammonia liquor and carbon dioxide in the amount higher by 25% than stoichiometric amount. $CO_2$ was introduced into the reaction through a ceramic diffuser. Carbon dioxide was passed through the solution, the surplus was captured and then passed again through the solution. Additionally, carbon dioxide captured in the reaction of calcium carbonate with nitric acid was pumped as below.

Reaction time 4 h, temp. 44° C., pH=9.1. In the conversion reaction, this time a smaller amount of ammonium sulphate was obtained as a solution, and after concentrating as a finished product, and also calcium carbonate sediment, settling together with silicates and noble metals included therein in the amount of approx. 45 kg. After filtering off on a filter press, the sediment was reacted with nitric acid at a concentration of 27%, favorably, and the main reaction took place:

$$CaCO_3+2HNO_3=Ca(NO_3)_2+CO_2+H_2O$$

Carbon dioxide was recirculated to the foregoing conversion reaction. In the reaction, calcium nitrate solution was formed with a sediment of silicates in the amount of approx. 16 kg. The solution was purified by adding tmt15 (trimercaptotriazine trisodium salt (15% solution) in the amount of 1 kg per 1 t of the solution). As a result of tmt15 precipitation a sediment is formed. The solution was separated from the sediment. The solution of calcium nitrate was concentrated to 45-50% to obtain a finished product in the form of a fertilizer in the amount of approx. 70 kg (lime saltpeter).

The sediment of metal complexes was dried and roasted to obtain a semi-finished product for further treatment.

The sediment of approx. 16 kg of silicates was circulated to an autoclave and silicates were dissolved at a pressure of 25000 hPa. The sediment resembling fine sand was covered with a solution of sodium hydroxide in water, wherein 35.2 kg of hydroxide solution was added to 16 kg of sediment, 1:1 with water, and the autoclave capacity was chosen to prevent its loading over 75% of capacity. Autoclave capacity: 70 l. The autoclave is heated with hot oil in an external jacket up to 300° C., 6 revolutions per minute, 2 h to obtain the temperature and pressure of 25000 hPa. All the parts used, including the measurement devices—manometer, thermometer—must be made without any copper alloys. After the dissolving reaction, the mixture was cooled down to 90° C. and then poured into a tank heated with water jacket adding water to reduce viscosity and have it at the level of 300 cPs, then 50 g of hydrazine hydrate was added during the process of continuous slow stirring and 60 g of dimethylglyoxime (DMG) in methyl alcohol 1:2. Then stirring is stopped and while the temperature is kept at 1:2 a sediment settles on the bottom with total concentration of noble metals at the level of 30%. The sludge contains: Pd, Rh, Ru, Au, Ag. Afterwards, the sludge is dissolved in concentrated $HNO_3$ and palladium and silver precipitated by 30 g of dimethylglyoxime in ethyl alcohol 1:2 are passed to the solution: a yellow sediment of palladium complex containing 13 g of pure palladium, and a grey sediment of silver; the other metals are separated by the methods known in the art.

EXAMPLE 2

Method according to example 1. —Out of 1 t of phosphogypsum 700 kg of the solution of mainly calcium nitrate is obtained with metal compounds dissolved therein. Calcium nitrate still contains heavy metals, lanthanides and actinides and is still not suitable for use as a fertilizer therefore further cleaning is required. The process was performed in two stages by precipitating insoluble metal complexes from the solution. The first stage comprised adding to the solution of ammonia nitrate ethyl alcohol with acetylacetone in the ratio 2:1, that is 10 kg of alcohol 1 and 5 kg of acetylacetone. Then, ammonia liquor was added to obtain pH of the solution at the level of 8.5 to precipitate insoluble acetylacetonides. The mixture was separated in a hydrocyclone to produce a solution and a wet sediment. The sediment was dried and then roasted at 800° C. to obtain a mixture of metal oxides. The solution was then subjected to precipitation again, this time with the use of trimercaptotriazine trisodium salt for 15% solution in the amount of 1 kg per 1 t of the solution. The leftover complexes of heavy metals were deposited. The sediment and the solution were separated by filtration in a filter press obtaining a pure solution of ammonia nitrate and a sediment of metal complexes. The solution was pumped to evaporate water until calcium nitrate concentration was 50%, thus producing a finished product. Evaporation took place in a solar tunnel—a low concrete pot with a flat bottom, size 10×3×0.1 m, covered with a foil tunnel and ventilated by a fan. The sediment of metal complexes is dried and roasted to obtain metal oxides; what is obtained is a ready semi-finished product—metal concentrate for further processing in the quantity of around 4 kg as total metal oxides from both precipitation processes. The concentrate contains mainly: lanthanides, U, Th, Ni, W, Cr, Mo and other metals.

EXAMPLE 3

An excavator took from the phosphogypsum dump, containing phosphogypsum in large almost homogenous clusters of several million tons originating from different mineral deposits (phosphorites: Morocco, Algeria, Senegal, Tunisia, Florida USA and apatites from the Kola Peninsula—Russia, a bed of waste phosphogypsum from the processing of apatites, and took a mass similar to soft gypsum rock, which was then broken up in a gypsum crusher and sieved on a screen, 12 mesh per 1 cm. For further processing, it is favorable if the bulk mass grain is smaller than 0.7 mm. Out of this, 1 t of phosphogypsum mass was dosed to a tank with a low speed stirrer, where water was added, which previously was passed through cold plasma field at 35° C. produced by the device manufactured by "NANTES" Ul. Dolne Mlyny 21, Boleslawiec of a capacity of 40 m3/day—energy consumption of 1 kw/h, wherein pH for this declustered water was 5.5. The water was added in the quantity of 2 t, and was stirred continuously until pulp was formed, and sulphuric acid was added to have its concentration of 7%. The mixture was heated while stirring continuously for 4 h up to a temperature of 70° C. Then, stirring was stopped. Gypsum was deposited via sedimentation, and the solution was pumped to another tank (tanks are made of acid-resistant of steel or of concrete covered with a layer of epoxy resin—here Epidian 607 with amine hardener IDA, cover layer of 5 mm—manufactured by Sarzyna).

20 kg of acetylacetone was added to the solution of $H_2SO_4$ 7% with pH of around 2.3, and the solution was neutralized to pH of 8.5 by adding ammonia liquor. These steps resulted in the first stage of heavy metals precipitation from the solution as described hereinabove. The final second stage of precipitation was obtained by adding thereto the 15% solution of trimercaptotriazine trisodium salt in the amount of 2 kg (that is 1 kg/1000 kg of the solution). Sedimentation was used for separation. Pure activated water acidified with sulphuric acid up to the concentration of 7% was recirculated to the process, and the sediment was transferred for processing by another plant as it is a precious source of metals, including lanthanides. Gypsum sediment in the first tank in the quantity of 980 kg was transferred for treatment in the Merseburg process according to example 1 and the following was obtained:

1—calcium carbonate—716 kg
2—ammonium sulphate—fertilizer (containing an addition of phosphates of 0.6%)=337 kg.

Ammonium sulphate solution was thickened and crystallized in a shallow concrete pot coated with a protective epoxy resin layer. The pot was covered with a foil tunnel, with air pumped by fans from one side, as a result of which minimum energy consumption made it possible to obtain crystalline ammonium sulphate as a ready-for-use agricultural fertilizer. Then, the solution of nitric acid was poured on 716 kg of calcium carbonate in a separate tank—and kept at 25° C. for 40 minutes. As a result, calcium nitrate solution was obtained with sediments of silicates and fluorides with metals and their compounds inside. The mixture was separated in a hydrocyclone, and calcium nitrate solution was poured into a separate tank, where after neutralization with ammonia to pH 8 heavy metals were precipitated with TMT 15 manufactured by Evonik (the quantity of trimercaptotriazine was 0.6 kg); after precipitation of heavy metals, evaporation and crystallization, approx. 680 kg of Norwegian saltpeter was left as a valuable fertilizer. The sediment of heavy metals, around 2 kg, including precious lanthanides such as e.g. europium, dysprosium was transferred for further treatment as a semi-finished product.

120 kg of the sediment of silicates and fluorides is a mixture of silicates, fluorides in the quantity of around 25 kg and a small amount of aluminosilicates—around 0.4 kg, and a mixture of metals such as hafnium, zirconium, niobium and noble metals. The sediment of silica and fluorides, constituting only 12% of the original mass of phosphogypsum with metals, was treated with concentrated sulphuric acid at 100° C. with continuous stirring (ratio 1:1 by weight) during 40 minutes. The following elements passed into the solution: hafnium (45 g), zirconium (35 g) and palladium (13 g), and calcium fluoride reacts giving off gaseous hydrogen fluoride and again calcium sulphate as a sediment. Gaseous hydrogen fluoride was passed through water to obtain hydrofluoric acid. The remaining sediment contained silicates with noble metals, and calcium sulphate. The reacting substances were separated. 100 g of acetylacetone and 15 g of dimethylglyoxime dissolved in ethyl alcohol (ratio 1:2) and then ammonia liquor to pH 8 was added to the solution of concentrated sulphuric acid containing metals dissolved under these conditions, mainly hafnium, zirconium, niobium, palladium, as a result of which acetylacetonides of metals and palladium complexes were precipitated. The sediment was separated from the solution. The solution contained ammonium sulphate which after concentration is an agricultural fertilizer ready for use The sediment with calcium sulphate and silicates with noble metals was subjected to another conversion reaction (Merseburg reaction).

As a result of another conversion, ammonium sulphate was obtained again (in smaller amount) in the form of a solution with a sediment of calcium carbonate (containing silicates, aluminosilicates and metals).

The sediment of mainly calcium was reacted with nitric acid in concentration of 30% to obtain calcium nitrate as a solution, where after precipitation of heavy metals with tmt15 and neutralization to pH 8.5 with ammonia liquor, pure agricultural fertilizer, namely ammonia nitrate was obtained, which was concentrated to 50% by evaporating water, and around 17 kg of silicate sediment was obtained.

17 kg of the silicate sediment was roasted at 850° C. for 20 minutes and then ground in an impact mill, type "Fritsch pulverisette 02002" to obtain grain size of 5-10 μm (for an industrial scale XZM type mill is used, series ultrafine Mill by Shanghai Zenith Company). The powder was transferred for hot dissolution in sodium hydroxide.

The process of dissolving powder-sand was performed without applying higher pressure in a three neck flask with a thermometer under a reflux condenser in the following conditions:

Process time: 1 h from the moment of boiling.
Temperature: 386-388 K
Powder-sand weight: 17 kg
NaOH weight=34 kg
dissolved in water=68 kg These conditions produce sodium metasilicates with metals dissolved therein and insoluble leftover of around 5%.

The hot solution was poured and diluted with water to obtain viscosity of around 300 cPs. Afterwards, noble metals in the form of sludge mixture were precipitated. Addition of hydrazine hydrate and oxalic acid and solution of dimethylglyoxime in methyl alcohol to the solution enabled precipitation by reduction and precipitation of insoluble oxalates. What was obtained was the sludge—mixture of noble metals with fluorides and aluminosilicates. 85 g of sludge contain Pd, Pt, Rh, Ru, Au as 25% of sludge weight. Noble metals constituting 21 g are separated and melted using the processes known in the art.

| Sample | Pd [ppm] HNO$_3$ | Rh [ppm] HNOP$_3$ | Pd [ppm] HCl:HNO$_3$ | Rh [ppm] HCl:HNO$_3$ |
|---|---|---|---|---|
| 1 | 4.92 | 0.38 | 3.82 | 0.31 |
| 1 | 5.64 | 0.44 | — | — |
| 2 | 3.97 | 0.13 | 2.34 | 0.06 |
| 2 | 3.68 | 0.15 | — | — |
| 3 | 2.74 | 0.03 | 1.56 | <GO |
| 3 | 2.81 | <GO | 2.25 | 0.03 |
| 4 | 3.82 | 0.14 | 3.31 | 0.11 |
| 4 | 3.81 | 0.11 | 3.38 | 0.11 |
| 5 | 3.79 | 0.05 | 4.61 | 0.06 |
| 5 | 4.15 | 0.05 | — | — |
| 6 | 5.55 | 0.03 | 4.55 | 0.03 |
| 6 | 5.48 | 0.04 | — | — |
| 1A | 5.11 | 0.41 | 5.72 | 0.48 |
| 1A | 5.06 | 0.40 | — | — |

| Sample | Pd [ppm] HCl:HNO$_3$ | Rh [ppm] HCl:HNO$_3$ | Pb [ppm] HCl:HNO$_3$ | Pd [ppm] HCl:HNO$_3$:HF | Rh [ppm] HCl:HNO$_3$:HF | Pb [ppm] HCl:HNO$_3$:HF |
|---|---|---|---|---|---|---|
| 1 | 9.2 | 0.56 | 1.95 | 3.8 | 0.36 | 2.89 |
| 1 | 8.9 | 0.52 | 1.88 | 4.5 | 0.45 | 3.61 |
| 2 | 5.7 | 0.13 | 6.40 | 0.7 | <GO | 12.5 |
| 2 | 6.3 | 0.13 | 6.80 | 1.1 | 0.08 | 9.03 |
| 3 | 3.6 | 0.15 | 21.0 | 1.0 | 0.05 | 14.4 |
| 3 | 4.1 | 0.04 | 10.0 | 1.0 | 0.07 | 7.78 |
| 4 | 21 | 0.15 | 6.95 | 3.0 | 0.18 | 9.56 |
| 4 | 26 | 0.53 | 20.4 | 2.2 | 0.16 | 9.61 |
| 5 | 8.0 | 0.08 | 2.81 | 0.6 | <GO | 3.89 |
| 5 | 8.0 | 0.08 | 2.69 | 0.7 | 0.05 | 4.00 |
| 6 | 36.2 | 0.17 | 12.91 | 1.0 | 0.03 | 6.80 |
| 6 | 36.0 | 0.16 | 13.94 | 0.5 | 0.03 | 8.21 |
| 1A | 8.3 | 0.38 | 3.31 | 3.1 | 0.27 | 4.81 |
| 2A | 8.1 | 0.41 | 2.80 | 3.0 | 0.26 | 4.31 |

Test performed at Warsaw University using ICP-MS spectrometer. The solutions used for tests were different than for the previous ones. Samples were dissolved in concentrated nitric acid and separately in aqua regia. The samples same as in the previous test showed a different composition, metal content was given in ppm (parts per million)

| | Ru96 | Rh103 | Pd104 | Ag109 | Au197 |
|---|---|---|---|---|---|
| A | 343.6027 | 414.2199 | 12867.98 | 42.4275 | 153.209 |
| A | 354.167 | 436.9686 | 13563.93 | 41.8447 | 50.3349 |
| A1 | 355.4784 | 432.9059 | 13261.1 | 106.1768 | 31.1899 |
| A1 | 353.8604 | 449.4545 | 13786.9 | 99.9073 | 23.7296 |
| B | 248.9358 | 111.5942 | 3895.573 | 323.624 | 18.8306 |
| B | 242.4843 | 110.663 | 3900.218 | 292.7444 | 16.6585 |
| C | 2174.614 | 20.1216 | 1205.599 | 158.2053 | 15.1218 |
| C | 2232.28 | 19.7459 | 1191.591 | 150.4423 | 13.028 |
| D | 289.0585 | 125.7178 | 4393.48 | 190.4348 | 11.9623 |
| D | 274.0517 | 124.4026 | 4415.731 | 187.9984 | 11.5681 |
| E | 170.7529 | 27.9954 | 1456.769 | 80.8863 | 11.7221 |
| E | 167.9406 | 28.4006 | 1479.951 | 67.1077 | 11.1445 |
| F | 140.3173 | 8.0532 | 846.3143 | 188.6559 | 9.7562 |
| F | 127.335 | 7.4693 | 844.5861 | 162.1869 | 9.4769 | results in micrograms/kilogram

Test by ICP-OES spectrometer was performed at the Marie Curie-Sktodowska University in Lublin, with the same samples solved only in aqua regia. Expressed in micrograms per kilogram.

| (AVERAGE) PHOSPHOGYPSUM COMPOSITION ON FEB. 7, 2015 | |
|---|---|
| Constituent/parameter | Content/concentration |
| Form | Crystalline salt |
| CaSO$_4$ * 2H$_2$O [%] | 94-96 |
| Moisture [% m/m] | 20-30 |
| pH | min. 2.6 |
| P$_2$O$_5$ total [%] | 0.6-2 |
| P$_2$O$_5$ soluble in water [%] | 0.1-1 |
| Ca$_3$(PO$_4$)$_2$ [%] | 1-2.2 |
| CaF$_2$ [%] | 1-2.5 |
| SiO$_2$ [%] | 0.7-1.5 |
| Fe$_2$O$_3$ [%] | 0.02-0.03 |
| Al$_2$O$_3$ [%] | 0.05-0.09 |
| As [ppm] | <1.5 |
| Cd [ppm] | 0.2-12 |
| Cr [ppm] | 1-16 |
| Ni [ppm] | 1-8 |
| Cu [ppm] | 2-10 |
| Zn [ppm] | 6-17 |
| Pb [ppm] | 5-20 |
| Mn [ppm] | 1-8 |
| Hg [ppm] | <1 |

Test performed by the phosphogypsum waste dump administrator in a limited scope, only major ingredients, and average content values.

The invention claimed is:

1. A method for complex treatment of phosphogypsum, said method comprising breaking up of phosphogypsum, washing the phosphogypsum with a solution of sulphuric acid, and stirring the mixture of phosphogypsum and sulphuric acid at a temperature between about 50° C. and about 80° C., wherein the solution of sulphuric acid has a concentration between about 2% to about 15%,
  wherein the resultant mixture of phosphogypsum and sulphuric acid is separated into a liquid fraction and a sediment containing mostly calcium sulphate characterized in that metals are precipitated from the liquid fraction,
  wherein the sediment containing mostly calcium sulphate is converted in the presence of ammonia liquor and carbon dioxide to provide ammonium sulphate and calcium carbonate,
  wherein the calcium carbonate is filtered and dried, and dissolved in a solution of nitric acid at a concentration between about 15% to about 30% while stirring continuously, and
  wherein $CO_2$ is formed, recirculated, and used in the fist-phase conversion of the sediment, and
  wherein the resultant mixture is separated into a solution of calcium nitrate with dissolved metals and a sediment of fluorides and silicates with metal precipitate,
  characterized in that precipitation of metals from the liquid fraction produced while phosphogypsum washing takes place by cooling the solution in order for phosphates to precipitate, and then the mixture is separated and phosphates are obtained in the form of a finished product for use as an addition for production of fertilizers, whereas trimercaptotriazine trisodium salt is added to the solution with metals so that metals can precipitate, and resultant mixture is separated again to obtain metal complex sediment as a semi-finished product and a liquid fraction which is recirculated into the washing process.

2. Method as claimed in claim 1 characterized in that the solution of sulphuric acid for washing is made using tap water or cold plasma activated water.

3. Method as claimed in claim 1 characterized in that in the process of phosphogypsum washing, while stirring, ultrasound is applied to the mixture.

4. Method as claimed in claim 1 characterized in that the solution of calcium nitrate with metals dissolved therein is neutralized with ammonia liquor to pH from 7 to 9, after which metals are precipitated in two stages by mixing with acetylacetone and then with trimercaptotriazine trisodium salt, and the resultant mixture is separated to obtain a sediment of complexes of metals and a solution of calcium nitrate, with the sediment of metal complexes being a semi-finished product for further separation, and the solution of calcium nitrate being a finished product.

5. Method as claimed in claim 1, characterized in that the sediment of fluorides and silicates with metal precipitate is hot solubilized at about 100° C. in concentrated sulphuric acid to obtain hydrogen fluoride and a mixture which is separated into a sediment of silicates containing metals and calcium sulphate and a solution of metals dissolved in concentrated sulphuric acid.

6. Method as claimed in claim 5 characterized in that the sediment of silicates with metals and calcium sulphate is converted in the presence of ammonia liquor and carbon dioxide to obtain ammonium sulphate as a finished product and calcium carbonate with silicates containing metals.

7. Method as claimed in claim 5 characterized in that calcium carbonate with silicates containing metals is dissolved in nitric acid at a concentration of about 15% to about 30%, wherein the resultant $CO_2$ is recirculated into the conversion process and the resultant mixture is separated to obtain a solution of calcium nitrate and a sediment of silicates with metals.

8. Method as claimed in claim 1 characterized in that the sediment of silicates with metals and calcium sulphate is converted in the presence of ammonia liquor and carbon dioxide to obtain ammonium sulphate as a finished product and calcium carbonate with silicates containing metals.

9. Method as claimed in claim 5 characterized in that a solution of sodium hydroxide is added to the sediment of silicates with metals, and the resultant mixture is heated to a temperature of about 100° C. to about 300° C., and after metal silicates are dissolved, water is added to the mixture to reduce viscosity of the solution, after which the process of metals precipitation is applied with the use of strong reducers, and the resultant mixture is separated to obtain a sediment of noble metals as a semi-finished product for further processing, and liquid glass which after concentrating is a finished sellable product.

10. Method as claimed in claim 5 characterized in that the solution of calcium nitrate is neutralized with ammonia liquor or ammonium to a pH of about 7 to about 9 and trimercaptotriazine trisodium salt is added to precipitate metals, and what is obtained is a fertilizer of mainly calcium nitrate in the form of a solution which is a finished product, and a concentrate of metal complexes which is a semi-product for further processing.

11. Method as claimed in claim 5 characterized in that the solution of metals in concentrated sulphuric acid is neutralized with ammonium to a pH of about 7 to about 9 to obtain ammonium sulphate, to which acetylacetone and dimethylglyoxime are added, after which the fraction is separated into a solution of ammonium sulphate and a sediment of concentrate of metal complexes, and then the solution of ammonium sulphate is concentrated and crystallized to obtain a finished product, and a sediment of metal complexes is dried and roasted to obtain a concentrate of metal compounds, mainly compounds of hafnium, zirconium, niobium and palladium as a semi-finished product for further processing.

12. Method as claimed in claim 5 characterized in that hydrogen fluoride produced in the process is used for saturating water to obtain hydrofluoric acid as a finished product.

13. Method as claimed in claim 8 characterized in that calcium carbonate with silicates containing metals is dissolved in nitric acid at a concentration of about 15% to about 30%, wherein the resultant $CO_2$ is recirculated into the conversion process and the resultant mixture is separated to obtain a solution of calcium nitrate and a sediment of silicates with metals.

14. Method as claimed in claim 1 characterized in that calcium carbonate with silicates containing metals is dissolved in nitric acid at a concentration of about 15% to about 30%, wherein the resultant $CO_2$ is recirculated into the conversion process and the resultant mixture is separated to obtain a solution of calcium nitrate and a sediment of silicates with metals.

15. Method as claimed in claim 1 characterized in that the solution of metals in concentrated sulphuric acid is neutralized with ammonium to a pH of about 7 to about 9 to obtain ammonium sulphate, to which acetylacetone and dimethylglyoxime are added, after which the fraction is separated into a solution of ammonium sulphate and a sediment of concentrate of metal complexes, and then the solution of ammonium sulphate is concentrated and crystallized to obtain a finished product, and a sediment of metal complexes is dried and roasted to obtain a concentrate of metal compounds, mainly compounds of hafnium, zirconium, niobium and palladium as a semi-finished product for further processing.

16. Method as claimed in claim 1 characterized in that hydrogen fluoride produced in the process is used for saturating water to obtain hydrofluoric acid as a finished product.

17. Method as claimed in claim 1, wherein the metals precipitated from the liquid fraction comprise lanthanides, phosphates and sulphates of metals soluble in diluted sulphuric acid.

18. A method for complex treatment of phosphogypsum, said method comprising breaking up of phosphogypsum, washing the phosphogypsum with a solution of sulphuric acid, and stirring the mixture of phosphogypsum and sulphuric acid at a temperature between about 50° C. and about 80° C., wherein the solution of sulphuric acid has a concentration between about 2% to about 15%,
- wherein the resultant mixture of phosphogypsum and sulphuric acid is separated into a liquid fraction and a sediment containing mostly calcium sulphate characterized in that metals are precipitated from the liquid fraction,
- wherein the sediment containing mostly calcium sulphate is converted in the presence of ammonia liquor and carbon dioxide to provide ammonium sulphate and calcium carbonate,
- wherein the calcium carbonate is filtered and dried, and dissolved in a solution of nitric acid at a concentration between about 15% to about 30% while stirring continuously, and
- wherein $CO_2$ is formed, recirculated, and used in the fist-phase conversion of the sediment, and
- wherein the resultant mixture is separated into a solution of calcium nitrate with dissolved metals and a sediment of fluorides and silicates with metal precipitate,
- characterized in that a solution of sodium hydroxide is added to the sediment of silicates with metals, and the resultant mixture is heated to a temperature of about 100° C. to about 300° C., and after metal silicates are dissolved, water is added to the mixture to reduce viscosity of the solution, after which the process of metals precipitation is applied with the use of strong reducers, and the resultant mixture is separated to obtain a sediment of noble metals as a semi-finished product for further processing, and liquid glass which after concentrating is a finished sellable product.

19. A method for complex treatment of phosphogypsum, said method comprising breaking up of phosphogypsum, washing the phosphogypsum with a solution of sulphuric acid, and stirring the mixture of phosphogypsum and sulphuric acid at a temperature between about 50° C. and about 80° C., wherein the solution of sulphuric acid has a concentration between about 2% to about 15%,
- wherein the resultant mixture of phosphogypsum and sulphuric acid is separated into a liquid fraction and a sediment containing mostly calcium sulphate characterized in that metals are precipitated from the liquid fraction,
- wherein the sediment containing mostly calcium sulphate is converted in the presence of ammonia liquor and carbon dioxide to provide ammonium sulphate and calcium carbonate,
- wherein the calcium carbonate is filtered and dried, and dissolved in a solution of nitric acid at a concentration between about 15% to about 30% while stirring continuously, and
- wherein $CO_2$ is formed, recirculated, and used in the fist-phase conversion of the sediment, and
- wherein the resultant mixture is separated into a solution of calcium nitrate with dissolved metals and a sediment of fluorides and silicates with metal precipitate,
- characterized in that the solution of calcium nitrate is neutralized with ammonia liquor or ammonium to a pH of about 7 to about 9 and trimercaptotriazine trisodium salt is added to precipitate metals, and what is obtained is a fertilizer of mainly calcium nitrate in the form of a solution which is a finished product, and a concentrate of metal complexes which is a semi-product for further processing.

* * * * *